United States Patent
Saishu et al.

[11] Patent Number: 5,922,242
[45] Date of Patent: Jul. 13, 1999

[54] LIQUID CRYSTAL DISPLAY

[75] Inventors: Tatsuo Saishu; Kohki Takatoh, both of Yokohama; Hideo Hama, Ichihara; Yukari Sakai, Kisarazu, all of Japan

[73] Assignees: Kabushiki Kaisha Toshiba, Kawasaki; Mitsui Chemicals, Inc., Tokyo, both of Japan

[21] Appl. No.: 08/858,811

[22] Filed: May 19, 1997

[30] Foreign Application Priority Data

May 20, 1996 [JP] Japan ................................. 8-124635

[51] Int. Cl.$^6$ .......................... C09K 19/52; C09K 19/32; G02F 1/133
[52] U.S. Cl. ................. 252/299.62; 252/299.01; 349/143; 349/182
[58] Field of Search .................. 252/299.62, 299.01; 349/143, 182

[56] References Cited

U.S. PATENT DOCUMENTS

| | | | |
|---|---|---|---|
| 5,322,639 | 6/1994 | Kawabata et al. | 252/299.62 |
| 5,352,379 | 10/1994 | Nishiyama et al. | 252/299.62 |
| 5,646,705 | 7/1997 | Higuchi et al. | 349/143 |
| 5,684,555 | 11/1997 | Shiba et al. | 349/149 |
| 5,686,932 | 11/1997 | Tomita | 345/94 |
| 5,725,798 | 3/1998 | Tatsuki et al. | 252/299.62 |

FOREIGN PATENT DOCUMENTS

| | | |
|---|---|---|
| 0 549 347 A1 | 6/1993 | European Pat. Off. |
| 0 617 109 A1 | 9/1994 | European Pat. Off. |
| 0 687 935 A1 | 12/1995 | European Pat. Off. |
| 0 724 182 A2 | 7/1996 | European Pat. Off. |
| 5-32973 | 2/1993 | Japan |
| 5-163248 | 6/1993 | Japan |
| 5-216003 | 8/1993 | Japan |

OTHER PUBLICATIONS

A. Fukuda; "Pretransitional Effect in AF–F Switching: To Suppress It or to Enhance It, That is My Question about AFLCDs" Asia Display '95, pp. 61–64, (1995).

*Primary Examiner*—C. H. Kelly
*Attorney, Agent, or Firm*—Oblon, Spivak, McClelland, Maier & Neustadt, P.C.

[57] ABSTRACT

An LCD which having a high response speed, a wide viewing angle and a high contrast and capable of displaying high-quality gray-scale images at normal temperature. The LCD comprises an array substrate, a counter substrate opposing the array substrate, pixel electrodes arranged on the the array substrate in rows and columns, each connected to an active element, a first orientation film provided on the pixel electrodes, a counter electrode opposing the pixel electrodes, arranged on the counter substrate, a second orientation film provided on the counter electrode, rubbed in a direction slightly inclined to a direction in which the first orientation has been rubbed, and a layer of antiferroelectric liquid crystal sealed in a gap between the first and second orientation films, the antiferroelectric liquid crystal being a smectic liquid crystal which contains an antiferroelectric liquid crystal compound represented by $R^1(O)$—$Zm$—$Y$—$E$—$COO$—$C^*HX$—$R^4$. The liquid crystal exhibits transmittance which increases monotonically with applied voltage and exhibits a memory margin M ranging from −1 to 0 at normal temperature. The memory margin M is given as $M=(V_{10}-V'_{90})/(V_{90}-V_{10})$.

6 Claims, 6 Drawing Sheets

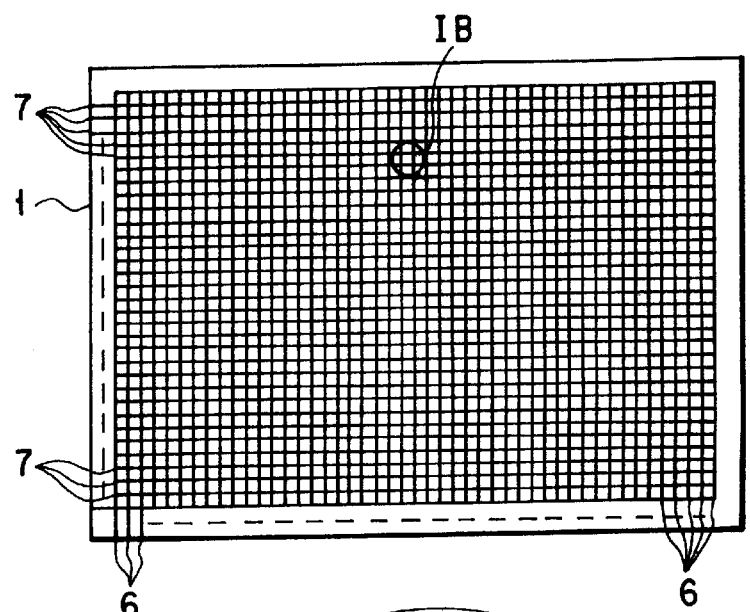
F I G. 1A
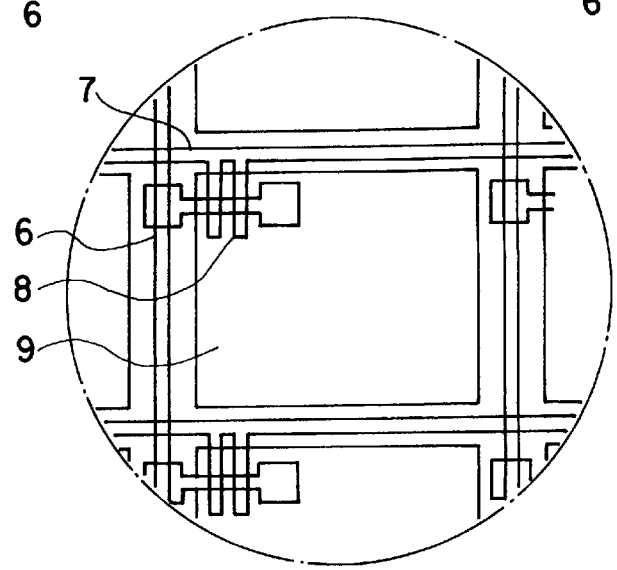
F I G. 1B
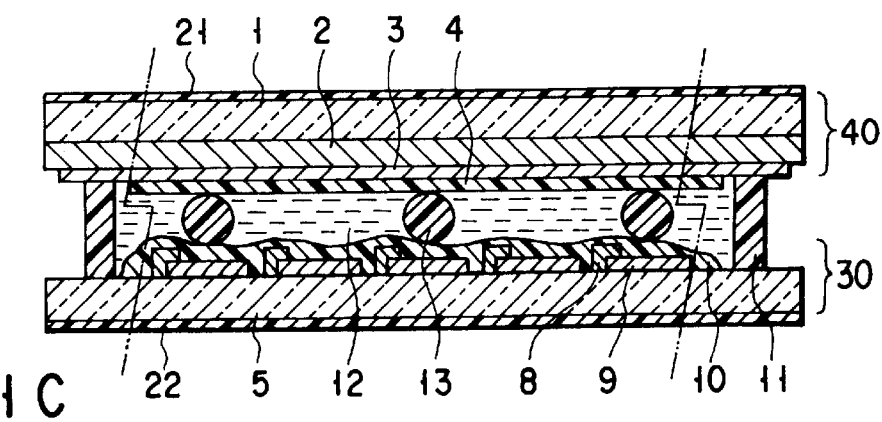
F I G. 1C

LIQUID CRYSTAL DISPLAY

BACKGROUND OF THE INVENTION

The present invention relates to an active matrix liquid crystal display which has thin film transistors or thin film diodes used as switching elements. More particularly, it relates to a liquid crystal display which excels in speed of response and viewing angle and which can display images in gray scale.

Liquid crystal displays (LCDs) is very advantageous over other types of displays since they are smaller and consumes less power. Actually, LCDs are used in personal computers and some other apparatuses. It is expected that they will be used as flat-panel displays in the future, in ever increasing numbers. Furthermore, new types of LCDs are being developed.

Nematic and Super Twisted Nematic Liquid Crystal

LCDs are classified into various types on the basis of the method of driving the liquid crystal. Of these types, the TN (Twisted Nematic) type and the STN (Super Twisted Nematic) type are widely employed at present. The TN-type LCD has TFTs (Thin Film Transistors), which drive nematic liquid crystal. In the STN-type LCD, nematic liquid crystal with an increased twist angle is driven by external means. Full-color, 10-inch to 20-inch LCDs of both types have been developed and are now commercially available for use in information-system terminals.

The TN-type LCD has acquired operating abilities which are fairly satisfactory for limited use, for example, in word processors and tabulation-calculation. The STN-type LCD has a response speed, but not so high that the LCD may be used in word processors or tabulation-calculation. Its viewing angle is too small. A retardation film, for example, is used to increase the viewing angle, but no sufficient angle has yet to be obtained. Thus, the STN-type LCD is not satisfactory in terms of response speed or viewing angle.

The TN-type LCD exhibits a fairly high response speed. When its screen size is increased, the TN-type LCD may no longer have a sufficient response speed because of the unnatural image of moving picture. The TN-type LCD has indeed a wider viewing angle than the STN-type LCD, but its viewing angle is not adequate for displaying full-color images. Because of its inadequate viewing angle, the TN-type LCD finds but limited uses.

As indicated above, it is much desired that nematic LCDs be developed which can efficiently work in information-system terminals. Nematic LCDs are available at present, but their operating abilities are sufficient for limited use only. When their screen size is increased, they no longer have an adequate viewing angle nor a sufficient response speed. The existing nematic LCDs inevitably find but limited uses.

Surface Stabilized Ferroelectric Liquid Crystal

In view of the above it has been proposed that smectic liquid crystal (more precisely, chiral smectic C-phase LC) be used. This is because smectic liquid crystal, whose molecules are more orderly aligned than those of nematic liquid crystal, exhibits a wide viewing angle and a high response speed. See N. A. Clark and S. T. Lagerwall, SSFLC: Surface Stabilized Ferroelectric Liquid Crystal, Appl. Phys. Lett. 36, 899 (1980). In an operating mode using SSFLC, SSFLC exhibits a response speed higher than that of nematic liquid crystal by about two to three orders of magnitude, and also a viewing angle comparable to that of a Cathode-Ray Tube.

In that operating mode, the helical structure of the chiral smectic C-phase LC is disintegrated by interaction of the liquid crystal and the orientation films, causing a spontaneous polarization. The polarization and the electric field interact with each other, generating a torque. The torque accomplishes switching of individual LC pixels. In this operating mode, SSFLC can be stabilized in only two states. SSFLC is stable when the direction of spontaneous polarization is along one of two opposite directions which are perpendicular to the interface between the orientation film and the liquid crystal. SSFLC can therefore have memory effect.

When SSFLC was announced, it was expected to be used without switching elements such as thin film transistors (TFTs). However, SSFLC is not used in practice. The reason is that a simple display mode using bistability cannot, in principle, display images in gray scale. However most LCDs for future use need to display full-color images, and the gray scale quality is indispensable for full-color images.

Nevertheless, to make use of the advantageous features of SSFLC, i.e., high response speed and wide viewing angle, researches has been conducted to develop methods of displaying gray-scale images by using SSFLC. Several methods have been proposed, some of which are disclosed in W. J. A. M. Hartmann, *Ferroelectrics*, 122, 1 (1991). In the methods disclosed in the thesis, the input signals are adjusted, enabling an SSFLC display to display gray-scale images. However, since SSFLC exhibits response characteristic equivalent to discontinuous switching operation called "domain inversion." Hence, it is impossible for the SSFLC to display gray-scale images without switching elements, only if the input signals are adjusted.

Antiferroelectric Liquid Crystal

Also proposed is an LCD using AFLC (Antiferroelectric Liquid Crystal) such as chiral smectic $C_A$-phase ($SC_A^*$phase), instead of chiral smectic C-phase ($SC^*$phase) which is a ferroelectric liquid crystal. (See A. D. L. Chandani, T. Hagiwara, T. Suzuki, Y. Ouchi, H. Takezoe, and A. Fukuda, Jpn. J. Appl. Phys. 27, L729 (1988).) In an operating mode using AFLC, AFLC is stabilized when the applied voltages is OV, in addition to the two stabilized states as SSFLC does. AFLC is characterized in that it assumes an antiferroelectric structure when no voltage is applied on it.

A representative relationship between the voltage applied on AFLC and the transmittance of AFLC is shown in FIG. 7A. In FIG. 7A, the voltage (V) is plotted on the abscissa, and the transmittance (T) is plotted on the ordinate.

As seen from FIG. 7A, the transmittance gradually increases as the voltage is lowered from 0 volt (changed toward negative direction). When the voltage is decreased to a particular negative value, the transmittance starts increasing sharply. Once the transmittance saturates (this value is regard as 100), it does not change even if the voltage is further lowered. As the voltage V is raised (changed toward positive direction) from this condition, the transmittance remains at 100 until the voltage increases to a particular value. Once the voltage reaches this value, the transmittance begins to decrease. Some time thereafter, the transmittance slowly decreases as the voltage is raised and reaches the minimum (this value regarded as 0) at the voltage of 0 V.

As the voltage is raised from 0 V, the transmittance again increases gradually as illustrated in FIG. 7A. When the voltage reaches a particular value, the voltage starts increasing sharply. Thereafter, the transmittance saturates, reaching 100. Then, the transmittance does not change even if the voltage is raised further. As the voltage V is lowered from this condition, the transmittance remains at 100 until the voltage reaches to a particular value. Once the voltage reaches this value, the transmittance begins to decrease sharply. Some time thereafter, the transmittance slowly decreases as the voltage is lowered and reaches the minimum of 0 at the voltage of 0 V.

As described with reference to FIG. 7A, the transmittance of AFLC has the minimum value (0) at 0 V, and the maximum value (100) at a specific negative value of voltage and a specific positive value of voltage. In other words, the transmittance of AFLC changes with the applied voltage over a certain ranges of both positive and negative voltage. This characterizing feature of AFLC can be applied to display gray-scale images.

It has been reported that an AFLC display can display gray-scale images without using active elements, when driven in a specific mode. For example, N. Yamamoto, N Koshoubu, K. Mori, K. Nakamura, and Y. Yamada, Ferroelectrics, 149, 295 (1993) report that a voltage ranging from $V_{10}$ to $V_{90}$ (FIG. 7A) may be applied to AFLC to display gray-scale images. The voltage range from $V_{10}$ to $V_{90}$ is used in both positive and negative voltage, this is because. This is because whether the voltage is positive or negative in this particular range, the transmittance of AFLC changes in the same manner. The transmittance varies sharply in the voltage range ($V_{10}$–$V_{90}$), which means the range is very narrow. Although the voltage range is narrow, the voltage-transmittance curve is almost linear. AFLC can therefore display gray-scale images when applied with a voltage falling within this specific range. In addition, since voltage within this range can be used both positive and negative range, image sticking can be prevented easily. (Image sticking would occur if a voltage only positive or negative were applied to AFLC, maintaining AFLC in a fixed polarized state though the voltage is changing and causing AFLC to display an after-image.) Furthermore, AFLC has its optical axis rotating to a specific direction once after the application of voltage to it is stopped. This characteristic of AFLC works well to display gray-scale images.

However, the above-mentioned voltage range ($V_{10}$–$V_{90}$) is too narrow to achieve gray-scale images of Satisfactory quality. Further, the voltage-transmittance curve varies with the temperature of AFLC. As shown in FIG. 7B, AFLC exhibits a voltage-transmittance curve I at a certain temperature and a different voltage-transmittance curve II at another temperature; namely, the voltage-transmittance relationship depends on the temperature of AFLC. The transmittance abruptly increases from the minimum value to the maximum value (or decreases from the maximum value to the minimum value) in specific voltage region. When a voltage within this region is applied to AFLC, the transmittance greatly changes with a slight temperature change.

Variation of the transmittance, caused by changes in temperature, makes no large problem so long as the AFLC display is operated in ON/OFF mode only, provided that the drive voltage is set on the basis of the temperature-dependency of the transmittance. To display gray-scale images, however, AFLC must be maintained in an extremely narrow temperature range. In view of this, the AFLC display cannot be used in practice to display gray-scale images.

Other Liquid Crystals

Further proposed are LCDs using chiral smectic C-type liquid crystal and operating in specific modes by using active elements. Examples of the operating modes of chiral smectic C-type LCDs are: DHF (Deformed Helix Ferroelectric Liquid Crystal) mode disclosed in J. Funfschilling and M. Schadt, J. Appl. Phys., 66, 15 (1989); and TFLC (Twisted Ferroelectric Liquid Crystal) mode disclosed in J. S. Patel, Appl. Phys. Lett., 60, 280 (1992).

The DHF display and the TFLC display need to have switching elements. Provided with switching elements, these liquid crystal displays are inevitably expensive. Nonetheless, they are advantageous in reliability of displaying gray-scale images. The DHF display and the TFLC display have a wider viewing angle than the TN-type LCD. But their viewing angles are smaller than those of the SSFLC display and the AFLC display. The DHF display has such a viewing angle, probably because DHF maintains its helical structure. The TFLC display has such a viewing angle, perhaps because TFLC has a twisted structure between the upper and lower orientation films.

Feasible Gray-Scale LCD

Of the above-mentioned liquid crystals which can serve to display gray-scale images, none have been found to have a response speed, a viewing angle, and temperature-dependence which are all satisfactory to provide a practical gray-scale LCD. Each of these liquid crystals has at least one problems and cannot be used to provide, in particular, a large-screen LCD. Demand for large-screen LCDs has been ever increasing. No other types of displays than LCDs can be thought of, as small, lightweight, low-power consumption displays. It is therefore desired that liquid crystals be developed which have a response speed, a viewing angle, and temperature-dependence all satisfactory to provide a practical gray-scale LCD.

As predicted, color LCDs will be dominant in the near future. To provide color LCDs which can display full-color images, liquid crystal having not only satisfactory response speed, viewing angle and temperature-dependence, but also an increased high contrast. For full-color images, the contrast directly determines the clearness of color, greatly influencing the quality of color images. Thus it is essential for the liquid crystal for use in a color LCD to exhibit high contrast.

BRIEF SUMMARY OF THE INVENTION

The object of the present invention is to provide a liquid crystal display (LCD) which has a high response speed, a wide viewing angle and a high contrast and which can display high-quality gray-scale images at normal temperature.

According to the invention, there is provided a LCD comprising: an array substrate; a counter substrate opposing the array substrate; pixel electrodes arranged on the the array substrate in rows and columns, each connected to an active element; a first orientation film provided on the pixel electrodes; a counter electrode opposing the pixel electrodes, arranged on the counter substrate; a second orientation film provided on the counter electrode, rubbed in a direction slightly inclined to a direction in which the first orientation film has been rubbed; and a layer of antiferroelectric liquid crystal sealed in a gap between the first and second orientation films, the antiferroelectric liquid crystal being a smectic liquid crystal which contains an go antiferroelectric liquid crystal compound represented by the following formula:

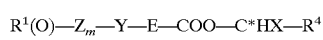

where:
R¹ is an alkyl group having 6 to 16 carbon atoms, having hydrogen atoms which may be substituted by halogen atoms, and having methylene and/or halomethylene groups some of which may be substituted by —O— groups, in which case the —O— groups are not adjacent to one another;

Z is a group selected from the group consisting of the following:

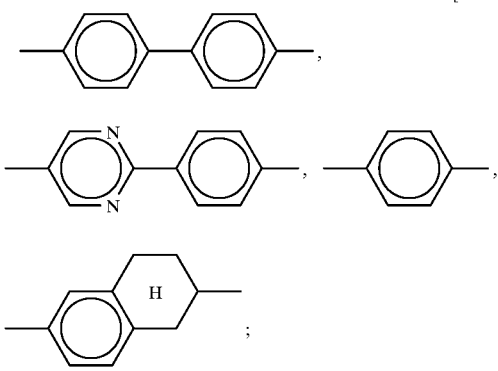

Y is a group selected from the group consisting of —COO—, —CH$_2$O—, —CH$_2$CH$_2$— and —OCH$_2$—;

E is a group selected from the group consisting of the following:

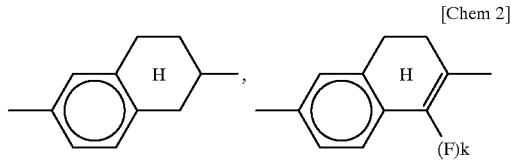

X is a group selected from the group consisting of —CH$_3$ group, —CH$_2$F group, —CHF$_2$ group and —CF$_3$ group;

R$^4$ is a straight-chain alkyl group having an even number of carbon atoms, the number selected from the group consisting of 4, 6 and 8, or having methylene groups one of which is substituted by —O— group;

m is 0 or 1; and k is 0 or 1.

Preferably, the antiferroelectric liquid crystal exhibits transmittance which increases monotonically with applied voltage and exhibits a memory margin M ranging from −1 to 0 at normal temperature, the memory margin M given as:

$$M=(V_{10}-V'_{90})/(V_{90}-V_{10})$$

where $V_{10}$ is a voltage at which the liquid crystal shows transmittance of 10 as the voltage is increased from 0 V, $V_{90}$ is the voltage at which the liquid crystal acquires transmittance of 90 as the voltage is increased from 0 V, and $V'_{90}$ is the voltage at which the liquid crystal shows transmittance of 90 as the voltage is decreased after the transmittance has reached its maximum value, the transmittance being regarded as 0 (minimum value) when the voltage applied is 0 V and being regarded as 100 (maximum value) when saturated.

The memory margin M of the liquid crystal is determined by the hysteresis, threshold voltage and threshold characteristic of the liquid crystal. The larger the hysteresis, the higher the threshold voltage, and the more steep the threshold characteristic, the greater the memory margin M. The memory margin corresponds to the bistability which a liquid crystal exhibiting large hysteresis has with respect to voltage changes. Almost all antiferroelectric liquid crystals used at present exhibit hysteresis in its voltage-transmittance curve.

Any conventional LCD using antiferroelectric liquid crystal is therefore driven in a mode utilizing that hysteresis. Thus, it has been thought that an antiferroelectric liquid crystal should better have as large a memory margin ('drive margin') as possible.

Memory margin M can be calculated from the above equation, even for a liquid crystal which exhibits but a small hysteresis and which is not bistable. The memory margin of a liquid crystal of this type has a negative value. A memory margin of a negative value is out of the scope of the original definition. If a liquid crystal has small hysteresis, a low threshold voltage, and gentle threshold characteristic, its memory margin approaches −1. If it has no hysteresis at all, its memory margin is −1. Hitherto, liquid crystals having a memory margin of a negative value have not been applied to evaluate their operating characteristics.

Antiferroelectric liquid crystal having a memory margin of a negative value can be used, in place of TN liquid crystal, in an LCD which has active elements and which can display gray-scale images. In such an LCD, the memory margin M should be as close to −1 as possible. If the liquid crystal exhibit a negligibly small hysteresis, the scanning time can be shortened without using compensation pulses even when the crystal is driven in asymmetry mode. If the liquid crystal has a low threshold voltage, it can be driven in low-voltage mode in which no bias involves. If the liquid crystal presents gentle threshold characteristic, it can serve to display gray-scale images the quality of which scarcely depends on temperature. Hence, to display gray-scale images, antiferroelectric liquid crystal must have a memory margin as small as possible, not as large as possible as has hitherto been demanded.

It has already been proposed that antiferroelectric liquid crystal exhibiting small hysteresis or no hysteresis and non-linear voltage-transmittance characteristic be used in an LCD which is provided with active elements. (See Jpn. Pat. Appln. KOKAI Publication 5-150257, Jpn. Pat. Appln. KOKAI Publication 6-194626 for example.) Use of such a liquid crystal alone cannot enable such an LCD to display gray-scale images at a low voltage. An LCD of this type can display gray-scale images at a low voltage only if it has a layer of antiferroelectric LC with an appropriate memory margin which is determined not merely by only the hysteresis but also by the threshold voltage and the threshold characteristic.

The LCD according to this invention comprises active elements and a layer of antiferroelectric liquid crystal with a memory margin M nearly equal to −1. The LCD can not only have a wide viewing angle and a high response speed, both achieved by the use of the antiferroelectric liquid crystal, but also can display gray-scale images of high resolution at a relatively low power consumption.

Preferably, the antiferroelectric liquid crystal presents chiral smectic C$_A$-phase (SC$_A$*phase) in a temperature range of −20° C. to 70° C.

More preferably, the antiferroelectric liquid crystal presents chiral smectic C$_A$-phase (SC$_A$*phase) in a temperature range of −20° C. to 70° C. and exhibits a memory margin M of a negative value in a temperature range of 10° C. to 40° C.

The tilt angle of a liquid crystal greatly depends upon temperature in a specific temperature range below the transition temperature at which the liquid crystal changes from smectic A-phase to smectic C-phase. The temperature dependence of the tilt angle is moderate at the temperature below that range. This means that in that temperature range the transmittance of a liquid crystal much changes even if the temperature varies a little. Thus an LCD with a layer of such a liquid crystal to display gray-scale images displays monochrome images the density of which changes much when the temperature varies a little, or displays color images the hue of which much changes when the temperature varies a little. In practice it is difficult to maintain LCDs at a desired temperature, because of the heat generated by the back light and the changes in ambient temperature. Hence, a liquid crystal which changes from smectic A-phase to smectic C-phase at a temperature close to the temperatures at which it is driven should not better be used to display gray-scale images. This is why the LCD of the present invention has a layer of antiferroelectric liquid crystal which presents chiral smectic $C_A$-phase ($SC_A$*phase) in a temperature range of −20° C. to 70° C. The LCD can therefore display gray-scale images of good quality.

The antiferroelectric liquid crystal used in the LCD of this invention exhibits a memory margin M of a negative value in the temperature range at which it is driven, for example 10° C. to 40° C. The LCD can therefore display images of good quality without after-image.

It is desired that the first and second orientation films be ones which have been made by rubbing layers of polyimide resin. Polyimide excels in various properties, such as orientation property, heat resistance, handling easiness, and reliability, and is therefore suitable as the material of orientation films.

Preferably, the second orientation film has a rubbing direction rotated by 168° to 174° clockwise from the rubbing direction of the first orientation film viewed from the first orientation film, or 6° to 12° anticlockwise.

Whether a color or monochrome image displayed on a large screen is of good quality or not largely depends on the contrast of the image. The LCD according to the invention can display high-contrast images because it incorporates orientation films which have the rubbing directions specified above. This has been proved experimentally, as will be described later. Since the orientation films have their rubbing directions slightly inclining to each other, they have far less defects than otherwise.

It is desired that the array substrate have a first polarizing film on an outer surface with a polarizing axis parallel to the orientation direction which the liquid crystal has when applied with no voltage (that is average direction of the long axis of liquid crystal molecular when applied with no voltage, and perpendicular to the smectic layers of the liquid crystal), and that the counter substrate have a second polarizing film on an outer surface with a polarizing axis perpendicular to the orientation direction.

Since the polarizing films have their polarizing axes positioned as described above with respect to the orientation direction the liquid crystal has when applied with no voltage, image sticking of the LCD screen can be prevented if the liquid crystal is driven in symmetrical mode.

Preferably, the antiferroelectric liquid crystal exhibits a voltage-transmittance curve having a slope (absolute value) of at most $500/(V_1-V_0)$ [volt$^{-1}$] in any region, where $V_0$ is the voltage at which the liquid crystal shows the minimum transmittance (that is 0 V), and $V_1$ is the voltage at which the liquid crystal saturates to the maximum transmittance as the voltage is increased from 0 V, the transmittance being regarded as "0" (minimum value) when the applied voltage is 0 V, and being regarded as "100" (maximum value) when it saturates.

If the liquid crystal exhibits a voltage-transmittance curve which has a slope (absolute value) of at most $500/(V_1-V_0)$ [volt$^{-1}$] in any region, it is easier to assign applied voltages to achieve gray-scale images. Thanks to the gentle slope of the voltage-transmittance curve, the transmittance of the liquid crystal changes but a little with temperature. This helps to maintain the high quality of the gray-scale images the LCD displays.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1A shows a schematic plan view of the LCD according to the invention, which has active elements;

FIG. 1B is an enlarged plan view of a one-pixel part of the LCD, which has a TFT;

FIG. 1C is a schematic cross-sectional view of the LCD illustrated in FIG. 1A;

DETAILED DESCRIPTION OF THE INVENTION

Figure 2A:
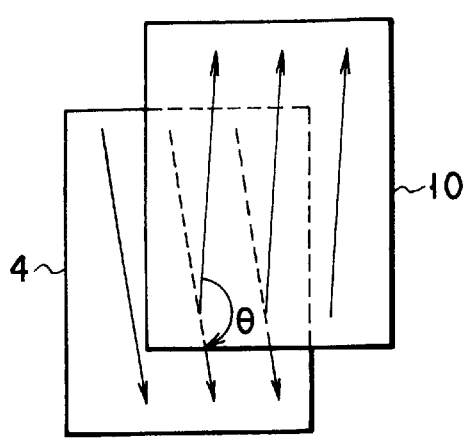
FIG. 2A is a diagram indicating the directions in which the orientation films incorporated in the LCD are rubbed.
Figure 2B:
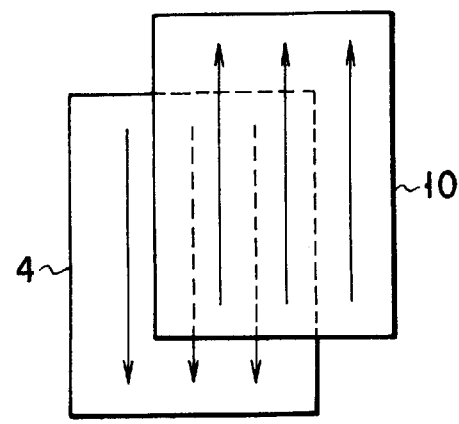
FIG. 2B is a diagram depicting the directions in which the orientation films used in a conventional LCD are rubbed.

A liquid crystal display (LCD) according to the present invention will be described, with reference to FIGS. 1A, 1B and 1C.

As shown in FIG. 1C, the LCD has an array substrate 30 and a counter substrate 40. The array substrate 30 comprises a glass substrate 5, signal lines 6, scanning lines 7, TFTs 8, and pixel electrodes 9. The signal lines 6, scanning lines 7 and TFTs 8 are arranged on the inner surface of the glass substrate 5. The pixel electrodes 9 made of ITO (Indium-Tin-Oxide) are arranged on the glass substrate 5, too, each covering the associated TFT 8 in part. An orientation film 10 (the first orientation film) is provided on the inner surface of the array substrate 30, covering the pixel electrodes 9 as is illustrated in FIG. 1C.

As FIG. 1C shows, the counter substrate 40 comprises a glass substrate 1, a color filter 2, and a counter electrode 3. The color filter 2 and counter electrode 3 are provided on the inner surface of the glass substrate 1, one on another in the order they are mentioned. The counter electrode 3 is made of ITO. An orientation film 4 is provided on the inner surface of the counter substrate 40, covering the counter electrode 3 as is illustrated in FIG. 1C.

The array substrate 30 and the counter substrate 40 oppose each other, spaced apart by a distance determined by micropearls 13. They are bonded to each other at their edge portions, with a frame-shaped adhesive layer 11. Thus the substrates 30 and 40 and the adhesive layer 11 define a closed space. The space is filled with liquid crystal 12. Polarizing filters 21 and 22 are bonded to the outer surface of the counter substrate 40 and that of the array substrate 30, respectively.

Figure 3A:
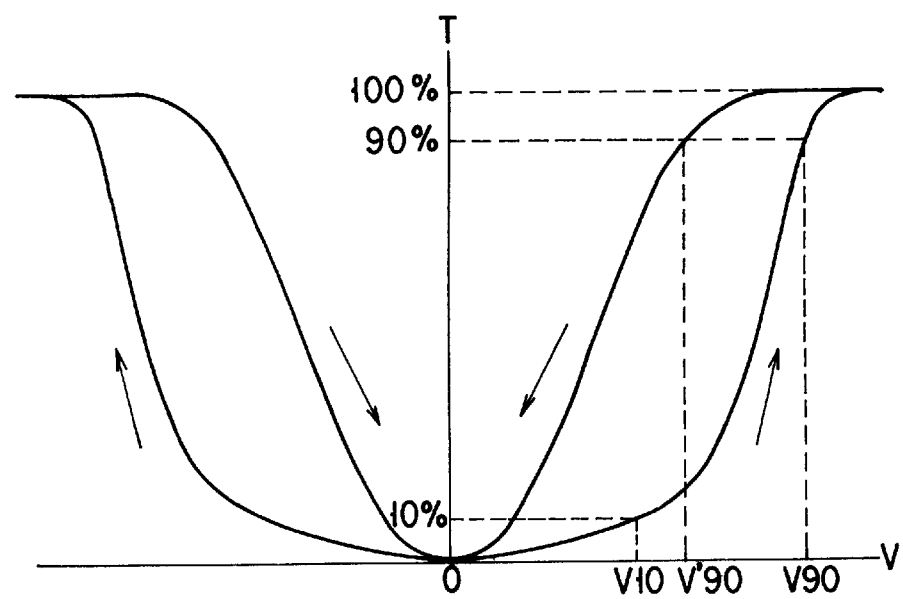
FIG. 3A is a graph representing the voltage-transmittance curve of the antiferroelectric liquid crystal used in the LCD according to the invention.
Figure 3B:
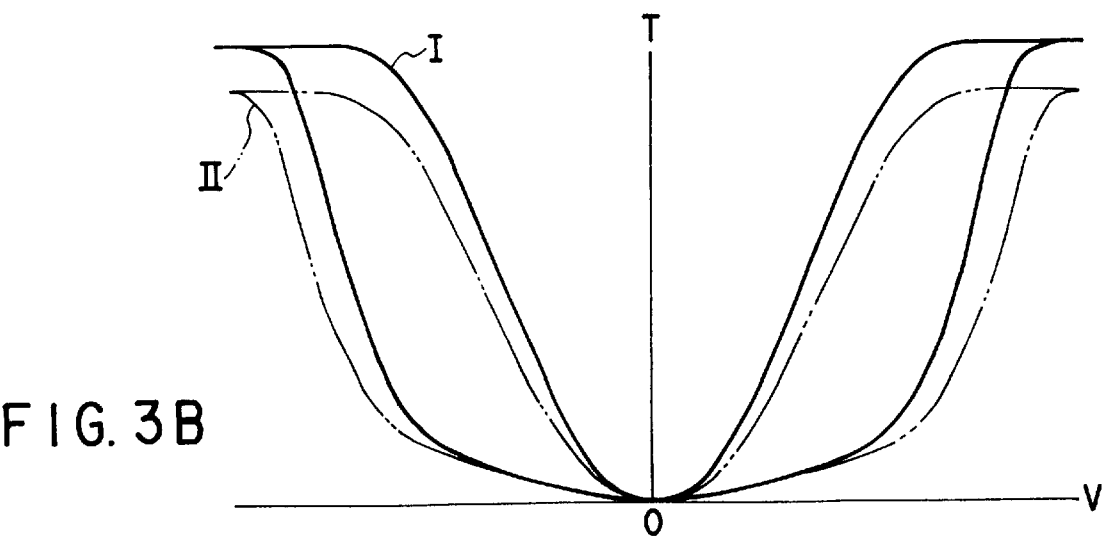
FIG. 3B is a graph showing the temperature-dependence of the voltage-transmittance relationship of the antiferroelectric liquid crystal of FIG. 3A.
Figure 4A:
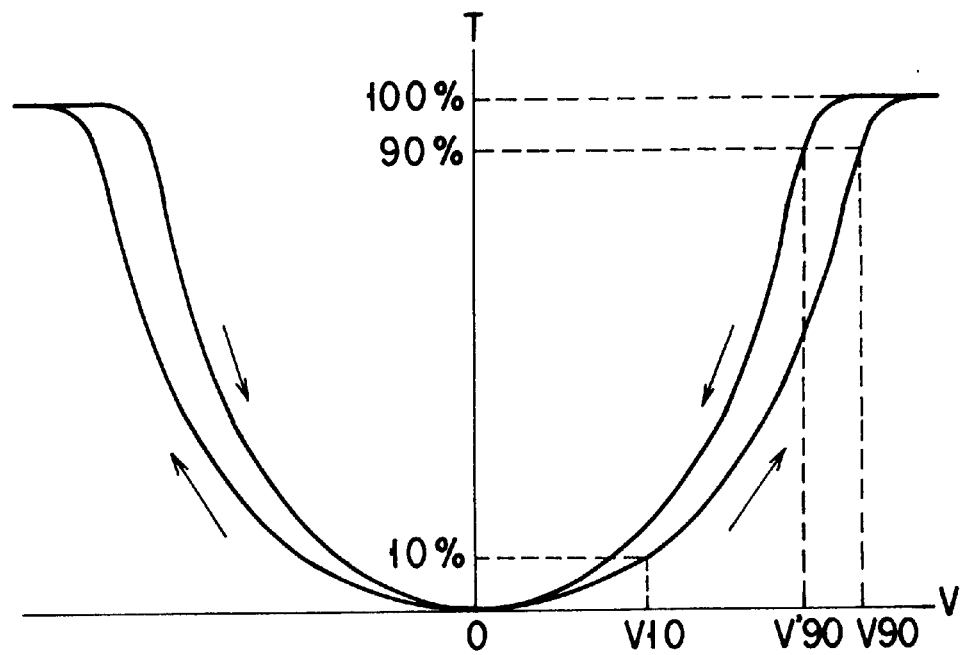
FIG. 4A is a graph indicating the voltage-transmittance curve of another antiferroelectric liquid crystal that may be used in the LCD according to the invention.
Figure 4B:
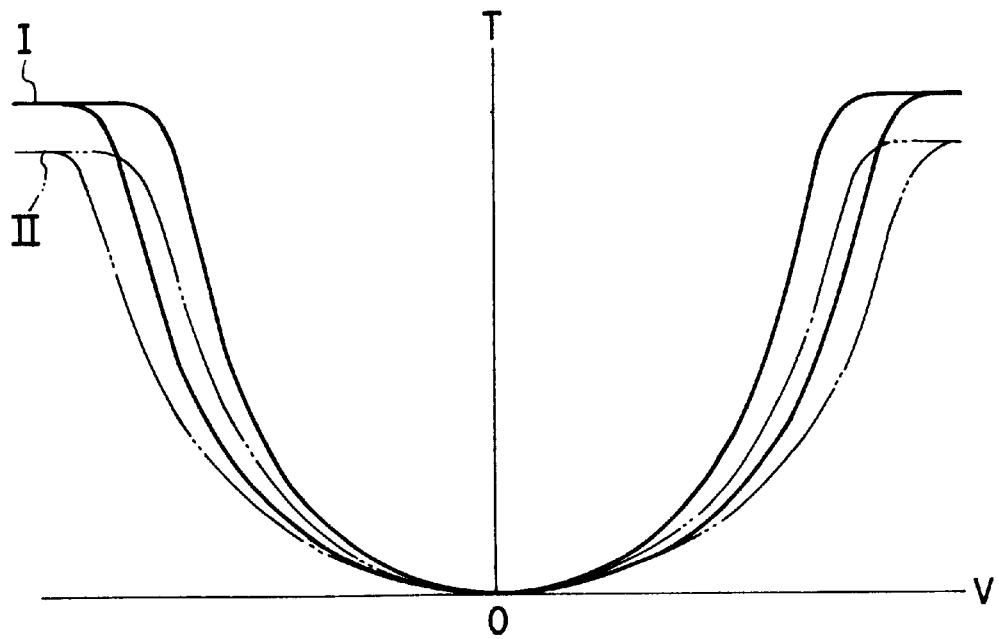
FIG. 4B is a graph presenting the temperature-dependence of the voltage-transmittance relationship of the antiferroelectric liquid crystal of FIG. 4A.

FIGS. 3A and 4A show the examples of voltage-transmittance curves of two antiferroelectric liquid crystals which may be used in the LCD according to this invention. FIGS. 3B and 4B represent the temperature-dependences of these antiferroelectric liquid crystals. As the curves shown in FIGS. 3A and 4A indicate, the transmittance of either liquid crystal saturates to the maximum value as the applied voltage (absolute value) rises above a specific value and decreases to the minimum value around 0 V. In the remaining region (i.e., the transient region), the transmittance increases gently as the voltage (absolute value) is increased. Hence, the transmittance of either antiferroelectric liquid crystal has small temperature-dependence. Even if the voltage-transmittance curves of the liquid crystals change from I to II or vice versa, as is shown in FIGS. 3B and 4B, the transmittance of either liquid crystal will not change noticeably, provided that the voltage applied to the liquid crystal remains unchanged. Hence, both antiferroelectric liquid crystals can display gray-scale images.

Quantatively stated, any antiferroelectric liquid crystals than can be used in the LCD according to the invention needs to have the following property. Namely, It must exhibit a voltage-transmittance curve which has, at any part of it, a slope (absolute value) of:

$500/(V_1-V_0)$[volt-1] or less, where $V_0$ is the voltage of which the liquid crystal shows the minimum transmittance (that is 0 V), and $V_1$ is the voltage at which the liquid crystal saturates to the maximum transmittance as the voltage is increased from 0 V. Here, the amount of light passing through the crystal when the transmittance is maximal (the maximum amount) is regarded as "100," and the amount of light passing through the crystal when the transmittance is minimal (the minimum amount) is regarded as "0."

Figure 5A:
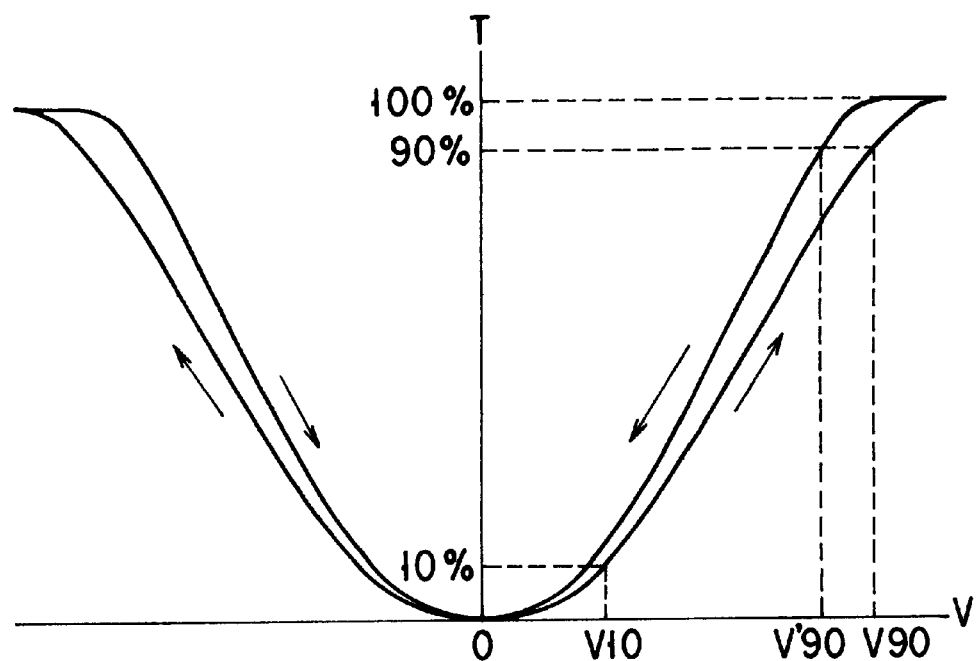
FIG. 5A is a graph illustrating the voltage-transmittance curve of still another antiferroelectric liquid crystal that may be used in the LCD according to the invention.
Figure 5B:
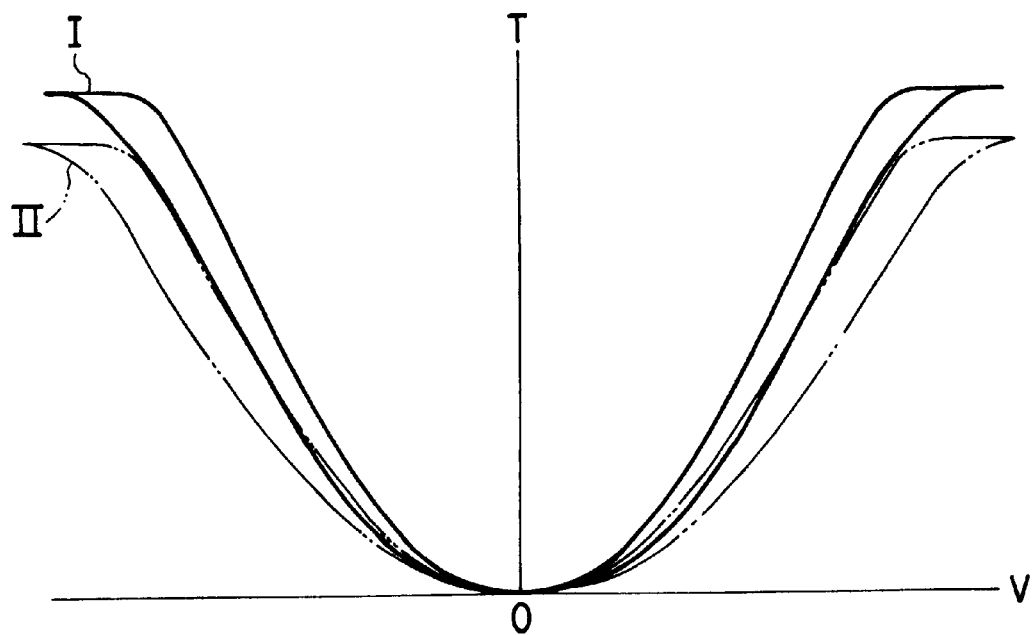
FIG. 5B is a graph depicting the temperature-dependence of the voltage-transmittance relationship of the antiferroelectric liquid crystal of FIG. 5A.
Figure 6A:
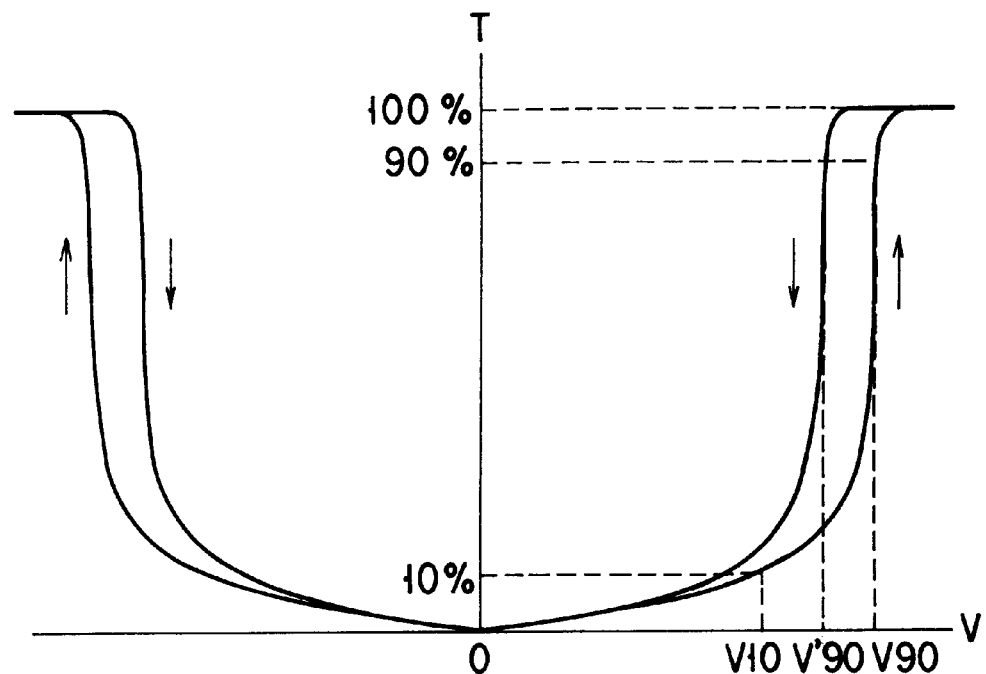
FIG. 6A is a graph representing the voltage-transmittance curve of a conventional antiferroelectric liquid crystal.
Figure 7A:
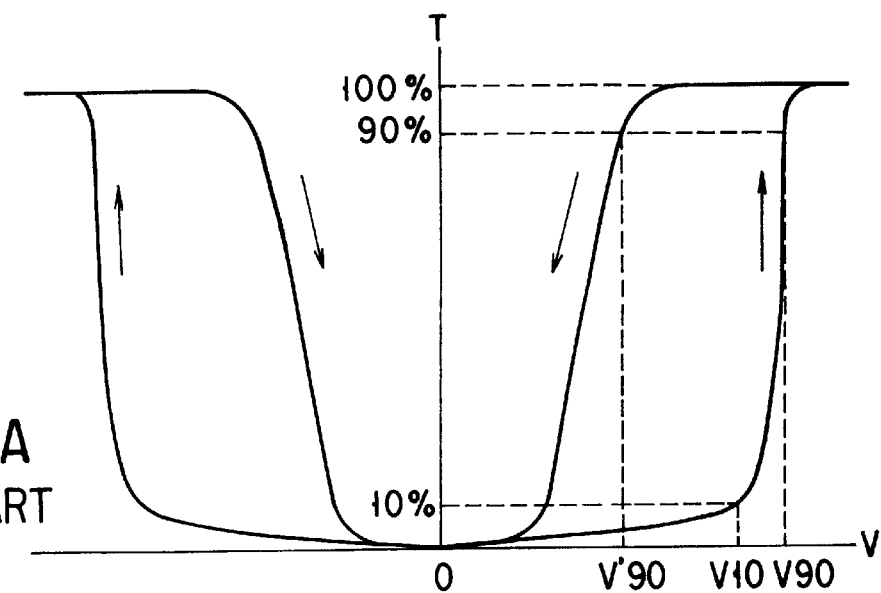
FIG. 7A is a graph illustrating the voltage-transmittance curve of a conventional antiferroelectric liquid crystal generally used.

Known as antiferroelectric liquid crystals exhibiting such a voltage-transmittance curve are, for example, MLC-0049, MLC-0068, MLC-0055 and MLC-0071 (trade names; Mitsui Petrochemical Industries, Ltd.) Of these liquid crystals, MLC-0049 has the voltage-transmittance curve shown in FIG. 5A. This voltage-transmittance curve changes with temperature as is illustrated in FIG. 5B. As clearly seen from FIG. 5B, the curve changes from I (at 25° C.) to II (at 40° C.), or vice versa. Nevertheless, the amount of light passing through liquid crystal MLC-0049 scarcely varies unless the voltage applied to the liquid crystal is changed. The voltage-transmittance curve shown in FIG. 4A pertaining to an antiferroelectic liquid crystal has a maximum slope (absolute value) of about $400/(V_1-V_0)$. The voltage-transmittance curve shown in FIG. 5A pertaining to another antiferroelectic liquid crystal has a maximum slope (absolute value) of about $200/(V_1-V_0)$. FIGS. 6A and 7A show the voltage-transmittance curves of conventional antiferroelectric liquid crystals, whose maximum slop is above $500/(V_1-V_0)$ A liquid crystal driven by active elements is required to exhibit a voltage-transmittance curve which has a slope of $500/(V_1-V_0)$ or less in the region between the regions where the transmittance is maximal and minimal, respectively, as is illustrated in FIGS. 3A, 4A and 5A. The transmittance of the liquid crystal gently increases as the voltage applied to it is raised. The liquid crystal can therefore serve to display gray-scale images. In other words, it is easier to assign applied voltages to achieve gray-scale images.

An LCD having a 10-inch screen or a larger screen cannot display a sufficiently gray-scale image if the liquid crystal used in it exhibits a voltage-transmittance curve whose maximum slope is as much as $500/(V_1-V_0)$. It follows that a liquid crystal having a voltage-transmittance curve which has a slope of $400/(V_1-V_0)$ or less at any part of it should be used in such a large-screen LCD.

The transmittance of any liquid crystal depends on the temperature of the crystal—almost in the same manner. Stated in another way, temperature-dependence is inherent in any liquid crystal. A liquid crystal exhibiting a voltage-transmittance curve having a gentle slope, however, can serve to display gray-scale images fairly well, thanks to that gentle slope of the curve.

Figure 6B:
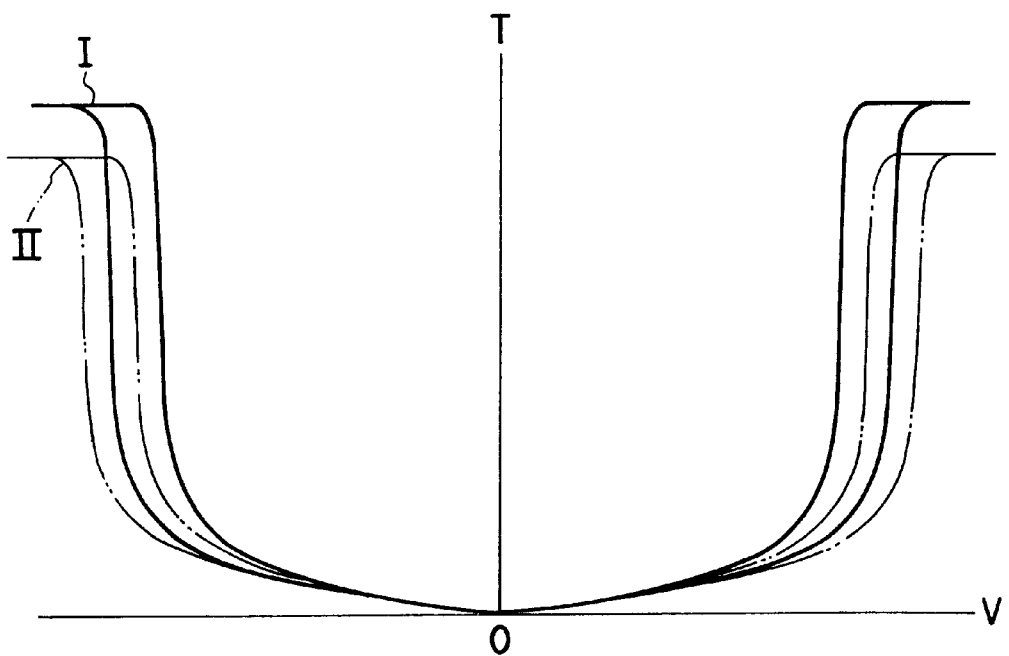
FIG. 6B is a graph showing the temperature-dependence of the voltage-transmittance relationship of the conventional antiferroelectric liquid crystal of FIG. 6A.
Figure 7B:
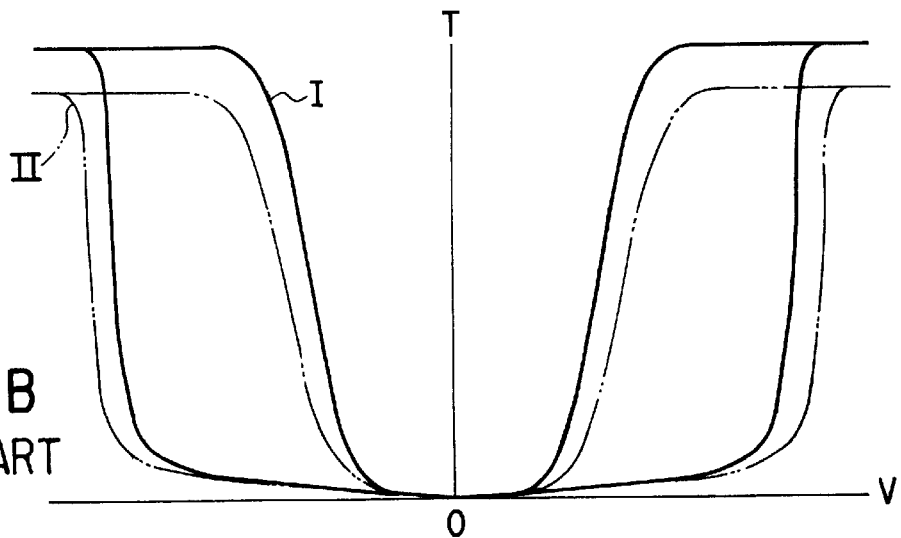
FIG. 7B is a graph representing the temperature-dependence of the voltage-transmittance relationship of the generally used conventional antiferroelectric liquid crystal of FIG. 7A.

By contrast, conventional antiferroelectric liquid crystals exhibit such voltage-transmittance curves as shown in FIGS. 6A and 7A, each having a steep slope. Their transmittance varies greatly when the voltage applied to them is changed a little. It is difficult to assign applied voltages to display gray-scale images. As FIGS. 6B and 7B indicate, the threshold value of voltage varies with the temperature. The transmittance of the conventional liquid crystals inevitably change very much even if the voltage applied to the crystals remains the same. The conventional antiferroelectric liquid crystals cannot be used in practice to display gray-scale images.

Liquid crystals for use in the LCD of the present invention need to have a memory margin M ranging from −1 from 0 in a temperature range including room temperature. The memory margin M of each liquid crystal is given:

$$M=(V_{10}-V'_{90})/(V_{90}-V_{10}) \qquad (1)$$

where $V_{10}$ is the voltage at which the liquid crystal shows transmittance of 10 as the voltage is increased from 0 V, $V_{90}$ is the voltage at which the liquid crystal acquires transmittance of 90 as the voltage is increased from 0 V, and $V'_{90}$ is the voltage at which the liquid crystal shows transmittance of 90 as the voltage is decreased after the transmittance has reached its maximum value. The memory margin M is thus defined, on the assumption that the transmittance is regarded as "0" (minimum value) when the voltage applied is 0 V and is regarded as "100" (maximum value) when saturated, and that the transmittance of the liquid crystal increases monotonically with the voltage, between the extremes of 0 and 100. It should be noted that the voltage applied on the liquid crystal is changed adequately slowly.

In the LCD according to this invention, a liquid crystal having chiral smectic $C_A$-phase ($SC_A$*phase) at least in the temperature range of $-20°$ C. to $70°$ C. is used so that the LCD may display gray-scale images of good quality. It is desired that the liquid crystal exhibit the above-defined memory margin M at a temperature range of $10°$ C. to $40°$ C., in which the LCD is actually used.

A few essential features which enables the LCD of the invention, using an antiferroelectric liquid crystal, to display high-quality gray-scale images, will be described below.

First, in FIG. 1C, the polarizing film 21 on the outer surface of the counter substrate 40 has a polarizing axis parallel to the optical axis which the liquid crystal has when applied with no voltage, and perpendicular to the polarizing axis of the polarizing film 22 provided on the outer surface of the array substrate 30. (Alternatively, the polarizing film 22 on the outer surface of the array substrate 30 may have a polarizing axis parallel to the optical axis which the liquid crystal has when applied with no voltage, and perpendicular to the polarizing axis of the polarizing film 21 provided on the outer surface of the counter substrate 40.) Since the polarizing film 21 has such a polarizing axis, image sticking of the screen of the LCD can be prevented, if the LCD is driven in symmetrical mode.

Second, both orientation films 4 and 10 (FIG. 1C) are made of polyimide resin. They have been prepared by rubbing polyimide-resin layers in specific directions as will be explained later. Polyimide excels in various properties, such as orientation property, heat resistance, handling easiness, and reliability. Resistant to heat and easy to handle, the orientation films 4 and 10 help to facilitate the manufacture of the LCD.

Third, the orientation films 4 and 10 have been made by rubbing polyimide-resin layers in directions generally antiparallel (different by 180°) but slightly inclined to each other, or in directions generally parallel (0°) but slightly inclined to each other—not in directions exactly antiparallel or parallel as in the manufacture of the conventional LCD. Experiments showed that LCDs incorporating orientation films made by rubbing polyimide-resin layers in such directions displayed images of a remarkably high contrast.

More specifically, the contrast is the highest if the orientation film 4 has a rubbing direction rotated by about 170° clockwise from the rubbing direction of the orientation film 10 (FIG. 2A), as viewed from the side of orientation film 10. A monochrome LCD can display images of higher contrast than that of the images displayed by the conventional LCDs if the rubbing direction of the orientation film 10 is rotated by 167° to 175° (or rotated by 347° to 355°). Experiments also shows that the film 4 has less defects than in the case where it has a rubbing direction which is antiparallel (or parallel) to that of the other orientation film 10. Were the rubbing directions of the films 4 and 10 antiparallel (or parallel), the LCD could not display sufficiently high-contrast images.

Figure 8A:
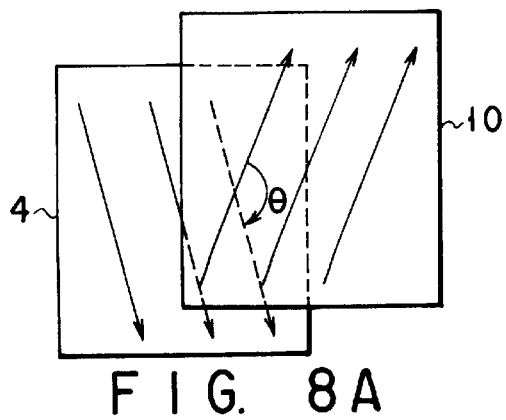
FIG. 8A is a diagram indicating the directions in which the orientation films used in a LCD of this invention are rubbed.
Figure 8B:
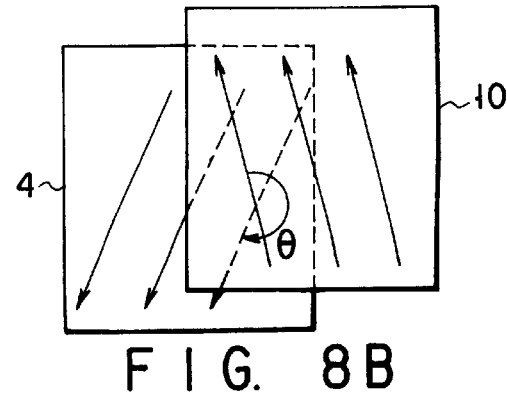
FIG. 8B is a diagram showing the different directions in which the orientation films used in a LCD for comparison rubbed.

Many LCD panels were made, each having two orientation films 4 and 10 rubbed in directions which are different by an angle ranging from 165° to 195°, varying in the unit of one degree, as shown in FIG. 8A and FIG. 8B. These LCD panels were incorporated into color LCDs, which were classified into two types A and B. The LCDs of type A were those in which the orientation film 4 has a rubbing direction rotated by less by 180° clockwise from the rubbing direction of the orientation film 10, as viewed from the side of orientation film 10. The LCDs of type B were those in which the film 4 has a rubbing direction rotated by more than 180° clockwise from the rubbing direction of the orientation film 10.

The LCDs of both types were tested for the clearness, color property and after-image characteristic, to determine the best possible rubbing directions for the orientation films 4 and 10. Those LCDs of type A in which the film 4 has a rubbing direction rotated by 168° to 174° clockwise from the rubbing direction of the film 10 displayed color images of fairly good clearness, color property and after-image characteristic. Particularly, the LCDs in which the angle between the rubbing directions of the films 4 and 10 ranges from 170° to 172° displayed very good color images. On the other hand, the LCDs of the type B failed to display color images of sufficient clearness, good color property or good after-image characteristic.

Monochrome images need to have an adequate black contrast only. Those LCDs of type A in which the angle between the rubbing directions of the films 4 and 10 ranges from 167° to 175° C. displayed monochrome images of good clearness. Note that this angle range is broader than the range of 168° to 174° within which the angle must fall to enable the LCD to display color images of sufficient quality.

As mentioned above, the LCD according to this invention comprises antiferroelectric liquid crystal 12, polarizing films 21 and 22 having specific polarizing axis, and orientation films 4 and 10 prepared by rubbing polyimide-resin layers in particular different directions. Therefore, the LCD of the present invention can display at normal temperature high-quality gray-scale images which at a wide viewing angle, at high response and in high contrast.

EXAMPLE 1

An LCD according to the invention, with a layer of antiferroelectric liquid crystal, was made and tested for its operating characteristics, as will be described below.

At first, an LCD panel of the same structure as shown in FIGS. 1A, 1B and 1C was made. The LCD has a panel 65 mm tall and 80 mm wide. The orientation films 4 and 10 of the LCD panel are made of polyimide resin known as AL-1051 (trade name; Japan Synthetic Rubber Co., Ltd.). The films 4 and 10 had been prepared by rubbing two layers of AL-1051 in two directions, respectively, which were almost antiparallel but slightly inclined to each other. More specifically, one AL-1051 layer had been rubbed in a direction rotated by 168° to 170° clockwise from the rubbing direction of the other AL-1051 layer, as viewed from the array substrate 30, as is illustrated in FIG. 8A.

The LCD panel has a layer 12 of antiferroelectric liquid crystal material MLC-0049 (trade trade name; Mitsui Petrochemical Industries, Ltd.). The liquid crystal is identified as (SC* 72° C. SA 99° C. Iso) and identical to the one used in Example 2 disclosed in Japanese Patent Application 7-246812. It is a composition made up of the compounds identified below:

[Chem 3]

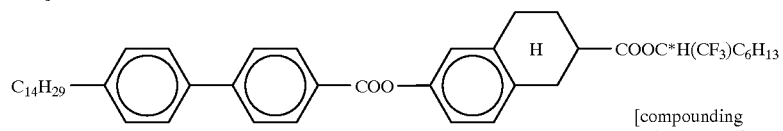

(I-1)

[compounding ratio: 10 wt %]

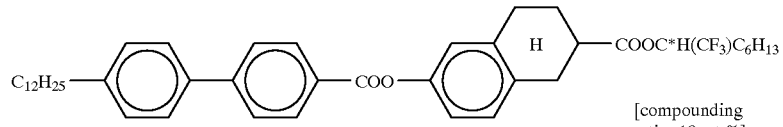

(I-2)

[compounding ratio: 10 wt %]

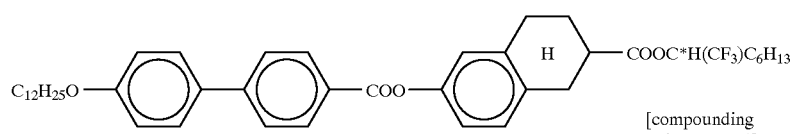

(I-3)

[compounding ratio: 40 wt %]

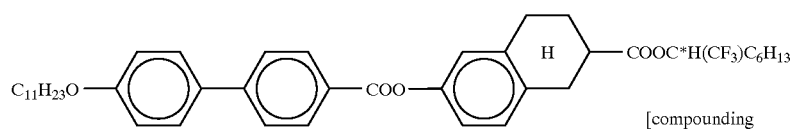

(I-4)

[compounding ratio: 10 wt %]

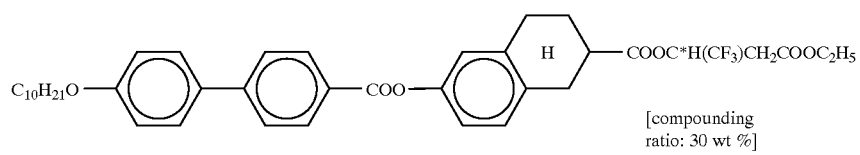

(II-1)

[compounding ratio: 30 wt %]

The LCD panel thus made was heated to 105° rendering the liquid crystal layer 12 isotropic. An AC voltage of 30 V was applied, as rectangular waves having a frequency of 100 Hz, to the liquid crystal layer 12. While the voltage was being applied to the layer 12, the LCD panel was gradually cooled to room temperature. The molecules of the layer 12 were thereby oriented in a desired manner.

The liquid crystal layer 12 thus obtained presented the voltage-transmittance curve which is illustrated in FIG. 5A. Also did the layer 12 exhibit a memory margin M of −0.5, a threshold voltage of 2 V and a saturation voltage of 6 V.

An LCD was manufactured which incorporated the LCD panel described above. The LCD was tested at 30° C., 40° C. and 50° C., for its operating characteristics. The LCD was found to operate in substantially the same way, at whichever temperature it was operated. It exhibited the operating characteristics shown in Table 1 presented below. Since the voltage-transmittance curve of the liquid crystal layer 12 has a gentle slope as shown in FIG. 5A, the antiferroelectic liquid crystal used in the LCD therefore exhibited small temperature-dependency. As shown in FIG. 5B, the voltage-transmittance curve changed from I (at 25° C.) to II (at 40° C.), or vice versa as the temperature of the liquid crystal layer 12 varied. The transmittance of the liquid crystal layer 12 changed but very little. The LCD could therefore display gray-scale images.

TABLE 1

| Contrast Ratio | 30:1 |
| Viewing Angle | Up-down, left-right 45° |
| Response speed | 14 Hz, 70 μs/line |
| Gray levels | 20 |

The LCD according to Example 1 exhibited high contrast, wide viewing angle, high response speed and many gray levels when operated at 30° C., 40° C. and 50° C. Example 1 proved to be an LCD with satisfactory operating characteristics.

Since the LCD panel was heated to 105° C. to process the liquid crystal layer 12, both orientation films 4 and 10 were required to be resistant to heat. In view of this, the films 4 and 10 should best be made of polyimide resin which excels not only in heat resistance but also in orientation property, handling easiness and reliability.

EXAMPLE 2

Some LCDs according to the invention were made and tested to find a range of angle within which the difference between the rubbing directions of the two orientation films should fall.

Color LCD panels were first made which have the same structure as the LCD illustrated in FIGS. 1A, 1B and 1C. Each LCD panel has a VGA type array substrate 30 having 640 signal lines and 480 scanning lines, a diagonal length of 10.4 inches (264 mm), and a cell gap of 2 μm. The liquid crystal used in the LCD panels was identical to the one used in Example 1. The color LCD panels were divided into six groups, in which six different polyimide resins listed below were used, respectively, as material of the orientation films 4 and 10:

P1: SE-1180 (Nissan Chemical Industries, Co., Ltd.; for use in simple matrix LCDs)
P2: SE-2170 (Nissan Chemical Industries, Co., Ltd.; for use in active matrix LCDs)
P3: SE-7210 (Nissan Chemical Industries, Co., Ltd.)
P4: SE-7311 (Nissan Chemical Industries, Co., Ltd.)
P5: SE-5211 (Nissan Chemical Industries, Co., Ltd.)
P6: AL-1051 (Japan Synthetic Rubber Co., Ltd.)

The color LCD panels thus made was connected, one by one, to an ordinary drive circuit which can supply reset pulses. Each LCD panel was driven in dual scan mode and horizontal-line common inversion mode, at frame frequency of 60 Hz (frame cycle: 16 ms) and charging time of 65 μs. Each LCD panel incorporated TFTs which can response to reset pulses. A reset pulse having a width of 100 μs was supplied to the TFTs in the second half of the frame cycle (16 ms). The signal voltage was set at maximum ±6 V.

Many LCDs were made, each having two orientation films 4 and 10 rubbed in directions which are different by an angle ranging from 165° to 195° (clockwise as viewed from the array substrate), varying in the unit of one degree. (Hereinafter, the angle will be referred to as "angle difference θ.") These LCDs (see FIGS. 8A and 8B) were tested for their image-display characteristics. More specifically, the image-displaying characteristics were determined in the following manner.

The LCDs were driven, displaying color images of a TV program broadcast. Twenty people were selected at random, between the ages of 20 to 69, having two men and two women in each age bracket of 20–29, 30–39, and so on. These persons saw the TV program each LCD displayed for one hour. After seeing the TV program on all LCDs, they filled, as requested, a questionnaire sheet on which "GOOD" and "NO GOOD", with respect to image clearness, color property and after-image characteristic, are printed for each LCD tested. The questionnaire sheets were collected and compiled. Of all LCDs tested, those which three or less people regarded as "GOOD" were rated as "X", those which 4 to 14 people found to be "GOOD" were evaluated as "C", those 15 to 17 people considered to be "GOOD" were evaluated as "B", and those which 18 or more people found to be "GOOD" were evaluated as "A."

EXAMPLE 2-1

Of all color LCDs tested, those which have orientation films made of polyimide resin P1 (SE-1180) consisted of LCDs of type A and LCDs of type B, both types being of the above definition.

Of the color LCDs of type A (FIG. 8A), those in which the angle difference θ ranges from 165° to 167° and those in which the angle difference θ ranges from 173° to 179° were rated as "X" in terms of image clearness, those in which the angle difference θ is 168°, 171° or 172° were evaluated as "C" in terms of image clearness, those in which the angle difference θ is 169° were considered to be "B" in terms of image clearness, and those in which the angle difference θ is 170° were rated as "A" in terms of image clearness. On the other hand, all color LCDs of type B (FIG. 8B) were evaluated as "X" in terms of image clearness, regardless of angle difference θ.

To make comparison, LCDs were made which have orientation films made of polyimide resin P1 and in which the angle difference θ is 180°. They were tested for their image-displaying characteristics and evaluated as "X" in terms of image clearness.

All color LCDs tested were found to be satisfactory in color property and after-image characteristic, in whichever condition they were driven. Thus, of the color LCDs whose orientation films are made of polyimide resin SE-1180, those of type A (FIG. 8A) in which the angle difference θ ranges from 168° to 172° can be put to practical use. In particular, those in which the angle difference θ is 169° are desirable for practical use, and those in which the angle difference θ is 170° are the most desirable.

EXAMPLE 2-2

Of all color LCDs tested, those which have orientation films made of polyimide resin P2 (SE-2170) consisted of LCDs of type A and LCDs of type B.

Of the color LCDs of type A (FIG. 8A), those in which the angle difference θ ranges from 165° to 169° and those in which the angle difference θ ranges from 174° to 179° were rated as "X" in terms of image clearness, those is which the angle difference θ is 173° were evaluated as "C", those in which the angle difference θ is 171° were evaluated as "A" in terms of image clearness, those in which the angle difference θ is either 170° or 172° were considered to be "B" in terms of image clearness. On the other hand, all color LCDs of type B (FIG. 8B) were evaluated as "X" in terms of image clearness, regardless of angle difference θ.

To make comparison, LCDs were made which have orientation films made of polyimide resin P2 and in which the angle difference θ is 180° were made. They were tested for their image-displaying characteristics and evaluated as "X" in terms of image clearness.

All color LCDs tested exhibited satisfactory color property and after-image characteristic in whichever condition they were driven. Thus, of the color LCDs whose orientation films are made of polyimide resin SE-2170, those of type A (FIG. 8A) in which the angle difference θ ranges from 170° to 173° can be put to practical use. Particularly, those in which the angle difference θ is either 170° or 172° were desirable for practical use, and those in which the angle difference is 171° were the most desirable.

EXAMPLE 2-3

Of all color LCDs tested, those which have orientation films made of polyimide resin P3 (SE-7210) consisted of LCDs of type A and LCDs of type B.

Of the color LCDs of type A (FIG. 8A), those in which the angle difference θ ranges from 165° to 167° and those in which the angle difference θ ranges from 172° to 179° were rated as "X" in terms of image clearness, those in which the angle difference θ is either 168° or 169° were evaluated as "C" in terms of image clearness, those in which the angle difference θ is 171° were considered to be "A" in terms of image clearness, and those in which angle difference θ is 170° were rated as "B." By contrast, all color LCDs of type B (FIG. 9B) were evaluated as "X" in terms of image clearness, regardless of angle difference θ.

To make comparison, LCDs were made which have orientation films made of polyimide resin P3 and in which the angle difference θ is 180° were made. They were tested for their image-displaying characteristics and evaluated as "X" in terms of image clearness.

All color LCDs tested were found to have adequate color property and after-image characteristic in whichever condition they were driven. Hence, of the color LCDs whose orientation films are made of polyimide resin SE-7210, those of type A (FIG. 8A) in which the angle difference θ ranges 168° to 171° can be put to practical use. Particularly, those in which the angle difference θ is 170° were desirable for practical use, and those in which the angle difference is 171° were the most desirable.

EXAMPLE 2-4

Of all color LCDs tested, those having orientation films made of polyimide resin P4 (SE-7311) consisted of LCDs of type A and LCDs of type B.

Of the color LCDs of type A (FIG. 8A), those in which the angle difference θ ranges from 165° to 169° and those in which the angle difference θ ranges from 175° to 179° were rated as "X" in terms of image clearness, those in which the angle difference θ is 170°, 173° C. or 174° were evaluated as "C" in terms of image clearness, those in which the angle difference θ is 172° were considered to be "A" in terms of image clearness, and those in which angle difference θ is 171° were rated as "B." On the other hand, all color LCDs of type B (FIG. 8B) were evaluated as "X" in terms of image clearness, regardless of angle difference θ.

To make comparison, LCDs were made which have orientation films made of polyimide resin P4 and in which the angle difference θ is 180° were made. They were tested for their image-displaying characteristics and evaluated as "X" in terms of image clearness.

All color LCDs tested proved to be satisfactory in color property and after-image characteristic, no matter in whichever condition they were driven. It follows that the color LCDs whose orientation films are made of polyimide resin SE-7311, those of type A (FIG. 8A) in which the angle difference θ ranges 170° to 174° can be put to practical use. Particularly, those in which the angle difference θ is 171° were desirable for practical use, and those in which the angle difference is 172° were the most desirable.

EXAMPLE 2-5

Of all color LCDs tested, those with orientation films made of polyimide resin P5 (SE-5211) consisted of LCDs of type A and LCDs of type B.

Of the color LCDs of type A (FIG. 8A), those in which the angle difference θ ranges from 165° to 167° and those in which the angle difference θ ranges from 173° to 179° were considered as "X" in terms of image clearness, those in which the angle difference θ is 168°, 171° C. or 172° were rated as "C" in terms of image clearness, and those in which the angle difference θ is either 169° or 170° were evaluated as "B" in terms of image clearness. By contrast, all color LCDs of type B (FIG. 8B) were evaluated as "X" in terms of image clearness, regardless of angle difference θ.

To make comparison, LCDs were made which have orientation films made of polyimide resin P5 and in which the angle difference θ is 180° were made. They were tested for their image-displaying characteristics and evaluated as "X" in terms of image clearness.

All color LCDs tested exhibited sufficient color property and after-image characteristic, no matter in whichever condition they were driven. It follows that the color LCDs whose orientation films are made of polyimide resin SE-5211, those of type A (FIG. 8A) in which the angle difference θ ranges 168° to 172° can be put to practical use. In particular, those in which the angle difference θ is either 169° or 170° were desirable for practical use.

EXAMPLE 2-6

Of all color LCDs tested, those having orientation films made of polyimide resin P6 (AL-1051) consisted of LCDs of type A and LCDs of type B.

Of the color LCDs of type A (FIG. 8A), those in which the angle difference θ ranges from 165° to 167° and those in which the angle difference θ ranges from 173° to 179° were rated as "X" in terms of image clearness, those in which the angle difference θ is either 168° or 172° C. were evaluated as "C" in terms of image clearness, those in which the angle difference θ is 169° or 171° were considered to be "B" in terms of image clearness, and those in which angle difference θ is 170° were rated as "A." On the other hand, all color LCDs of type B (FIG. 8B) were evaluated as "X" in terms of image clearness, regardless of angle difference θ.

To make comparison, LCDs were made which have orientation films made of polyimide resin P6 and in which the angle difference θ is 180° were made. They were tested for their image-displaying characteristics and evaluated as "X" in terms of image clearness.

All color LCDs tested proved to have satisfactory color property and after-image characteristic, in whichever condition they were driven. Therefore, of the color LCDs whose orientation films are made of polyimide resin AL-1051, those of type A (FIG. 8A) in which the angle difference θ ranges 168° to 172° can be put to practical use. Particularly, those in which the angle difference θ is either 169° or 171° were desirable for practical use, and those in which the angle difference is 170° were the most desirable.

Summary of the Evaluation Test

The image-clearness of each color LCD of type A tested is summarized in the following Table 2, and the image clearness of each color LCD of type B tested is summarized in the following Table 3.

TABLE 2

Image Clearness of Type A

| | Angle difference (degree) | | | | | | | | | | | | | | |
|---|---|---|---|---|---|---|---|---|---|---|---|---|---|---|---|
| Resin | 179 | 178 | 177 | 176 | 175 | 174 | 173 | 172 | 171 | 170 | 169 | 168 | 167 | 166 | 165 |
| P1 | X | X | X | X | X | X | X | C | C | A | B | C | X | X | X |
| P2 | X | X | X | X | X | X | C | B | A | B | X | X | X | X | X |
| P3 | X | X | X | X | X | X | X | X | A | B | C | C | X | X | X |
| P4 | X | X | X | X | X | C | C | A | B | C | X | X | X | X | X |
| P5 | X | X | X | X | X | X | X | C | C | B | B | C | X | X | X |
| P6 | X | X | X | X | X | X | X | C | B | A | B | C | X | X | X |

TABLE 3

Image Clearness of Type B

| Resin | Angle difference (degree) | | | | | | | | | | | | | | |
|---|---|---|---|---|---|---|---|---|---|---|---|---|---|---|---|
| | 181 | 182 | 183 | 184 | 185 | 186 | 187 | 188 | 189 | 190 | 191 | 192 | 193 | 194 | 195 |
| P1 | X | X | X | X | X | X | X | X | X | X | X | X | X | X | X |
| P2 | X | X | X | X | X | X | X | X | X | X | X | X | X | X | X |
| P3 | X | X | X | X | X | X | X | X | X | X | X | X | X | X | X |
| P4 | X | X | X | X | X | X | X | X | X | X | X | X | X | X | X |
| P5 | X | X | X | X | X | X | X | X | X | X | X | X | X | X | X |
| P6 | X | X | X | X | X | X | X | X | X | X | X | X | X | X | X |

As can be understood from Tables 2 and 3, any color LCD of Example 2 can display images of high contrast if the rubbing directions of the orientation films are almost antiparallel (different by 180°) but slightly inclined to each other.

This phenomenon is interpreted as follows. Antiferroelectric liquid crystal sealed in the gap between two substrates is gradually cooled, changing from an isotropic liquid to a smectic A-phase. As the liquid crystal changes so, the electric field generated by orientation films induces smectic C-phase in the vicinity of the films, due to so-called electroclinic effect. Now that the smectic C-phase is induced, the molecules of the antiferroelectric liquid crystal tilt to the rubbing directions of the orientation films. The tilt direction of the LC molecules is determined by the polarities of the orientation films and the sign of the spontaneous polarization of antiferroelectric liquid crystal. The polarities of the films are determined by the rubbing directions, which means that smectic C-phase is induced in smectic A-phase as the LC molecules tilt to the rubbing directions.

Therefore, the smectic layers of liquid crystal sealed between the two orientation films are kept parallel when the direction of rubbing is tilted from 180° slightly. And this prevents the generation of defects in orientation.

As mentioned above, the tilt direction of the LC molecules is determined by not only the polarities of the orientation films, but also the sign of the spontaneous polarization of antiferroelectric liquid crystal. An orientation film made of polyimide resin tilts the direction of spontaneous polarization toward the liquid crystal (LC) layer from the interface between the film and the LC layer. As the direction of the spontaneous polarization is tilted in this direction, the sign of the spontaneous polarization Ps. of smectic A-phase changes to the positive. This also helps to tilt the LC molecules, when the rubbing directions of the orientation films in the LCDs are arranged as type A (FIG. 8A).

Were each orientation film made of material such as polyacrylonitrile, which tilts the direction of spontaneous polarization to the interface between the film and the LC layer from the LC layer, the LCDs of type B (FIG. 8B) would display high-contrast images, as well.

COMPARATIVE EXAMPLE 1

An LCD was made as Comparative Example 1, which was identical to the LCD of Example 1, except that MLC-0038 (trade name; Mitsui Petrochemical Industries, Ltd.) was used as antiferroelectric liquid crystal. Antiferroelectric liquid crystal MLC-0038 exhibited the voltage-transmittance characteristic represented in FIG. 7A and a memory margin M of 4.

Comparative Example 1 was first driven in ordinary mode. Prominent image sticking of the screen occurred, and Comparative Example 1 could hardly display images. It was then driven by so-called resetting pulse at an operating temperature of 30° C. Comparative Example 1 exhibited the operating characteristics shown in the following table:

TABLE 4

| Contrast Ratio | 25:1 |
|---|---|
| Viewing Angle | Up-down, left-right 45° |
| Response speed | 14 Hz, 70 μs/line |
| Gray levels | 10 |

As seen from Table 4, Comparative Example 1 had good operating characteristics when driven at 30° C. When it was driven at 40° C., however, the contrast of the image displayed decreased to 7:1. When it was driven at 50° C., the contrast decreased to 3:1, and the image displayed was far from satisfactory. The reason is that the voltage-transmittance curve of the liquid crystal (MLC-0038) has a large-gradient portion as is shown in FIG. 7A. That is, the transmittance of the liquid crystal greatly changes with the temperature, while the same voltage is being applied to the liquid crystal. As a consequence, the brightness (or density) of gray-scale images changes sharply. (Nonetheless, the voltage-transmittance characteristic of liquid crystal MLC-0038 depends on temperature as seen from curves I and II shown in FIG. 7B, almost in the same way as does the voltage-transmittance characteristic of any antiferroelectric liquid crystal used in Example 1.)

COMPARATIVE EXAMPLE 2

Another LCD was made as Comparative Example 2, which was identical to the LCD of Example 1, except that

[Chem 8]

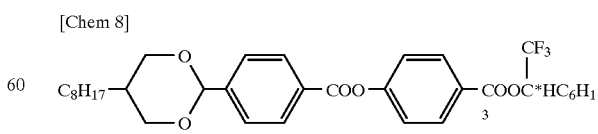

was used as antiferroelectric liquid crystal. This antiferroelectric liquid crystal presented the voltage-transmittance characteristic represented in FIG. 6A and a memory margin M of −0.2.

Comparative Example 2 was first driven at 30° C. It exhibited the operating characteristics specified in the following table:

TABLE 5

| | |
|---|---|
| Contrast Ratio | 25:1 |
| Viewing Angle | Up-down, left-right 45° |
| Response speed | 14 Hz, 70 μs/line |
| Gray levels | 10 |

As Table 5 teaches, Comparative Example 2 exhibited satisfactory operating characteristics when it was driven at 30° C. When it was driven at 40° C., however, the contrast of the image displayed decreased to 7:1. When it was driven at 50° C., the contrast decreased to 3:1, and the image displayed was far from desirable. This is because the voltage-transmittance curve of the liquid crystal has a large-gradient portion as is shown in FIG. 6A. In other words, the transmittance of the liquid crystal greatly changes with the temperature, while the same voltage is being applied to the liquid crystal. Consequently, the brightness (or density) of gray-scale images changes sharply.

COMPARATIVE EXAMPLE 3

A further LCD was made as Comparative Example 3, which was identical to the LCD of Example 1, except that the orientation films 4 and 10 (FIG. 1C) had been prepared by rubbing two polyimide-resin layers in directions antiparallel (different by 180°).

Comparative Example 3 was driven. It displayed an image which had contrast far lower than the images displayed by Example 1.

Composition of Antiferroelectric LC Material

As has been described, various antiferroelectric liquid crystal materials can be used in the LCD according to the invention. The compositions of some of them will be described.

Any liquid crystal material that can be used in the present invention is a smectic liquid crystal or a blend of a smectic liquid crystal and at least another material, so long as either presents antiferroelectric property. Not only MLC-0049 used in Example 1, but also MLC-0068, MLC-0055 and MLC-0071 (trade names, all manufactured by Mitsui Petrochemical Industries, Ltd).

The composition of MLC-0049 has already been described, in conjunction with the explanation of Example 1. MLC-0068, MLC-0055 and MLC-0071 are, combinations of several compounds represented by the formula of

similar to MLC-0049. Moreover, other compositions can be used as smectic liquid crystals in the present invention.

Further, the compounds identified by the following formulas can be used as smectic liquid crystals:

[Chem 4]

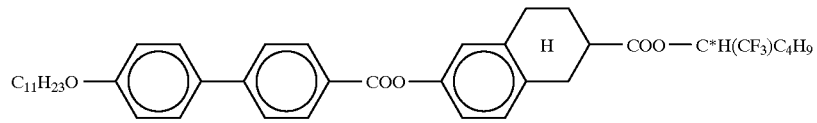
(I-5)

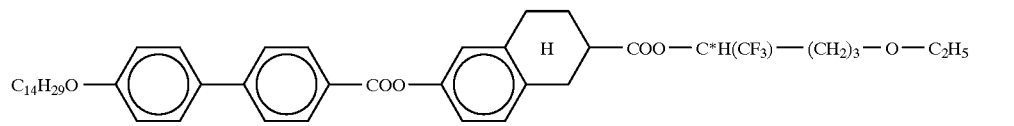
(I-6)

For example, a composition consisting of these compounds (I-5 and I-6) and compound II-1 identified in describing Example 1, in the particular ratio given below, may be used as antiferroelectric liquid crystal in the present invention:

| Compound | Wt % |
|---|---|
| I-5 | 48 |
| I-6 | 47 |
| II-1 | 5 |

The antiferroelectric liquid crystal material of this composition has a memory margin M of about −1. Memory margin M of a liquid crystal is determined by the hysteresis, threshold voltage and threshold characteristic of the liquid crystal. (The larger the hysteresis, the higher the threshold voltage, and the more steep the hysteresis characteristic, the greater the memory margin M.) This liquid crystal is good for active-matrix drive and found to best perform its function when used in a TFT liquid crystal display which can display gray-scale images.

Also, the compounds identified by the following formulas can be used as smectic liquid crystals:

[Chem 5]

(I-7)
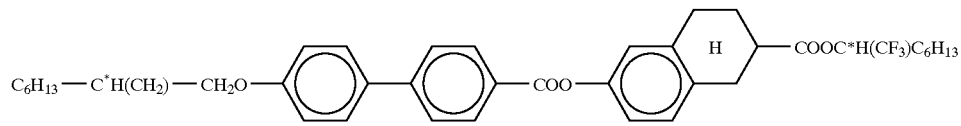

(I-8)
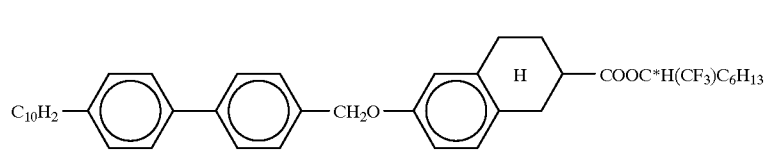

(II-2)
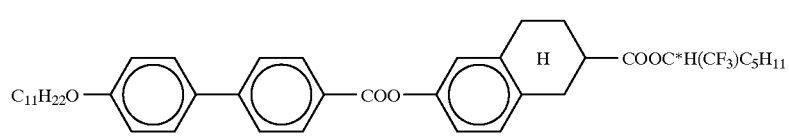

These compounds I-7, I-8 and II-2 are admixed in the ratio shown below, thereby forming an antiferro-electirc liquid crystal material:

| Compound | Wt % |
|---|---|
| I-7 | 20 |
| I-8 | 20 |
| II-2 | 60 |

The antiferroelectric liquid crystal material of this composition has a memory margin M of about −1. The liquid crystal material is good for active-matrix drive and found to best perform its function when used in a TFT liquid crystal display which can display gray-scale images.

Alternatively, compounds I-1, I-8 and II-2, all identified above, may be admixed in the ratio specified below, thereby providing an antiferroelectirc liquid crystal material:

| Compound | Wt % |
|---|---|
| I-1 | 76 |
| I-8 | 5 |
| II-2 | 19 |

This antiferroelectric liquid crystal material has a memory margin M of about −1. It is good for active-matrix drive and found to best perform its function when used in a TFT liquid crystal display which can display gray-scale images.

The compounds identified by the following formulas can be used as smectic liquid crystals:

[Chem 6]

(I-9)
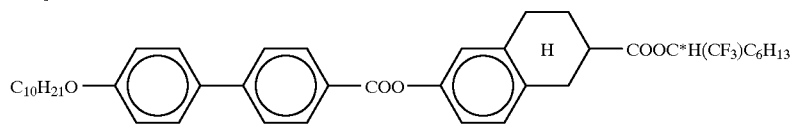

(I-10)
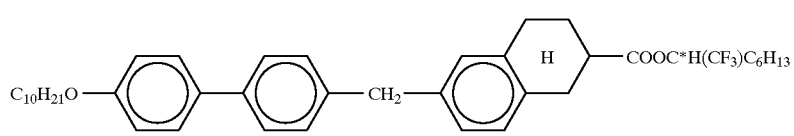

[Chem 7]

(II-3)
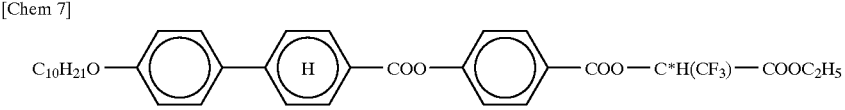

These compound, compounds I-1 to I-4 identified above, and compound II-1 identified above, too, may be admixed at the following three different ratios:

| Compound | Ratio A | Ratio B | Ratio C |
|---|---|---|---|
| I-1 | 10 wt % | 10 wt % | 10 wt % |
| I-2 | — | 10 wt % | 10 wt % |
| I-3 | — | 40 wt % | 40 wt % |
| I-4 | 10 wt % | — | — |
| I-9 | 10 wt % | 10 wt % | 10 wt % |
| I-10 | 40 wt % | — | — |
| II-1 | 30 wt % | 20 wt % | — |
| II-3 | — | 10 wt % | 30 wt % |

All these antiferroelectric liquid crystal materials have a memory margin M of about −1. They are suitable for active-matrix drive. They are found to best perform their function when used in a TFT liquid crystal display which can display gray-scale images.

As has been described above, the LCD according to the present invention has a layer of antiferroelectric liquid crystal. Therefore, it has a higher response speed, a wider viewing angle and a higher contrast than an LCD having a twisted nematic liquid crystal. Since the antiferroelectric liquid crystal exhibits voltage-transmittance characteristic represented by a curve which has a gentle slope, it serves to display gray-scale images, unlike surface stabilized ferroelectric liquid crystal (SSFLC). Further, the LCD of the invention can display images having good clearness, color property and after-image characteristic, because the orientation films are made of polyimide resin and have rubbing directions generally antiparallel (different by 180°) but slightly inclined (by about 10°) to each other, or generally parallel but slightly inclined, and because the liquid crystal layer is driven by active matrix (TFTs).

The LCD according to this invention can display even full-color moving pictures which are comparable in quality with those displayed by a cathode-ray tube.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:
1. A liquid crystal display comprising:
an array substrate;
a counter substrate opposing said substrate;
pixel electrodes arranged on said array substrate in rows and columns, each connected to an active element;
a first orientation film provided on said pixel electrodes;
a counter electrode opposing said pixel electrodes, arranged on said counter substrate;
a second orienitation film provided on said counter electrode, rubbed in a direction inclined to a direction in which said first orientation film has been rubbed; and
a layer of antiferroelectric liquid crystal sealed in a gap between said first and second orientation films, said antiferroelectric liquid crystal being a smectic liquid crystal which contains an antiferroelectric liquid crystal compound represented by the following formula;

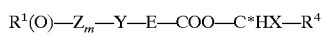

where;
$R^1$ is an alkyl group having 6 to 16 carbon atoms, having hydrogen which may be substituted by halogen atoms, and having methylene and/or halomethylene groups some of which may be substituted by —O— groups, in which case the —O— groups are not adjacent to one another;
Z is a group selected from the group consisting of the following:

(Chem 1)

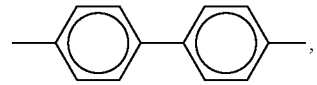

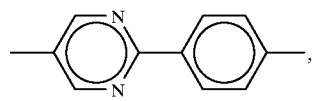

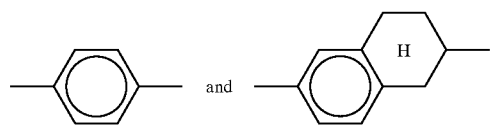

Y is a group selected from the group consisting of —COO—, —CH$_2$O—, —CH$_2$CH$_2$— and —OCH$_2$—;
E is a group selected from the group consisting of the following:

(Chem 2)

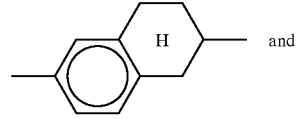

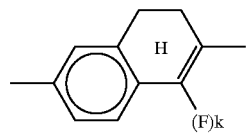

X is a group selected from the group consisting of —CH$_3$ group, —CH$_2$F group, —CHF$_2$ group and —CF$_3$ group;
$R^4$ is a straight-chain alkyl group having an even number of carbon atoms, the number selected from the group consisting of 4, 6 and 8, or having methylene groups one of which is substituted by —O— group;
m is 0 or 1; and
k is 0 or 1, wherein said antiferroelectric liquid crystal presents chiral smectic C$_A$-phase (SC$_A$*phase) in a temperature range of −20° C. to 70° C.

2. A liquid-crystal display according to claim 1, wherein said first and second orientation films have been made by rubbing layers of polyimide resin.

3. A liquid crystal display according to claim 2, wherein said second orientation film has a rubbing direction rotated by 168° to 174° clockwise from the rubbing direction of said first orientation film viewed from the first orientation film, or by 6° to 12° anticlockwise.

4. A liquid crystal display according to claim 1, wherein said array substrate has a first polarizing film on an outer surface with a polarizing axis parallel to the orientation direction which said liquid crystal has when applied with no voltage, said counter substrate has a second polarizing film on an outer surface with a polarizing axis perpendicular to the orientation direction.

5. A liquid crystal display according to claim 1, wherein said antiferroelectric liquid crystal exhibits a voltage-transmittance curve having a slope (absolute value) of at most $500/(V_1-V_0)$ [volt$^{-1}$] in any region, where $V_0$ is the voltage at which the liquid crystal shows the minimum transmittance, and $V_1$ is the voltage at which the liquid crystal substrates to the maximum transmittance as the voltage is increased from 0 V, the transmittance being regarded as 0 when the applied voltage is 0 V, and being regarded as 100 when it saturates.

6. A liquid crystal display comprising:

an array substrate;

a counter substrate opposing said array substrate;

pixel electrodes arranged on said array substrate in rows and columns, each connected to an active element;

a first orientation film provided on said pixel electrodes;

a counter electrode opposing said pixel electrodes, arranged on said counter substrate;

a second orientation film provided on said counter electrode, rubbed in a direction inclined to a direction in which, said first orientation film has been rubbed; and a layer of antiferroelectric liquid crystal sealed in a gap between said first and second orientation films, said antiferroelectric liquid crystal being a smectic liquid crystal which contains an antiferroelectric liquid crystal compound represented by the following formula:

$$R^1(O)-Z_m-Y-E-COO-C^*HX-R^4$$

where;

$R^1$ is an alkyl group having 6 to 16 carbon atoms, having hydrogen atoms which may be substituted by halogen atoms, and having methylene and/or halomethylene groups some of which may be substituted by —O— groups in which case the —O— groups are not adjacent to one another;

Z is a group selected from the group consisting of the following:

(Chem 1)

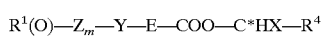

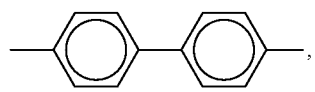

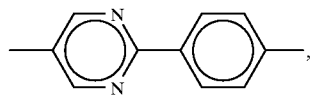

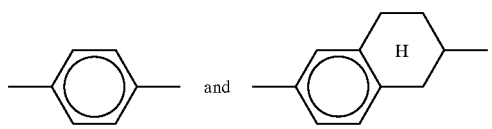

Y is a group selected from the group consisting of —COO—, —CH$_2$O—, —CH$_2$CH$_2$— and —OCH$_2$—;

E is a group selected from the group consisting of the following:

(Chem 2)

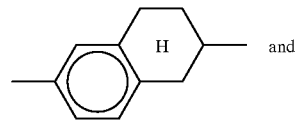

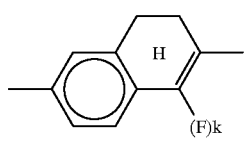

X is a group selected from the group consisting of —CH$_3$ group, —CH$_2$F group, —CHF$_2$ group and —CF$_3$ group;

$R^4$ is a straight-chain alkyl group having an even number of carbon atoms, the number selected from the group consisting of 4, 6 and 8, or having methylene groups one of which is substituted by —O— group;

m is 0 or 1; and k is 0 or 1, wherein said antiferroelectric liquid crystal exhibits transmitting which increases monotonically with applied voltage and exhibits a negative memory margin M ranging from −1 to 0 at a temperature of 10° C. to 40° C. said memory margin M given as;

$$M=(V_{10}-V'_{90})/(V_{90}-V_{10})$$

where $V_{10}$ is a voltage at which the liquid crystal shows transmittance of 10 as the voltage is increased from 0 V, $V_{90}$ is the voltage at which the liquid crystal acquires transmittance of 90 as the voltage is increased from 0 V, and $V'_{90}$ is the voltage at which the liquid crystal shows transmittance of 90 as the voltage is decreased after the transmittance has reached its maximum value, the transmittance being regarded as 0 (minimum value) when the voltage applied is 0 V, and being regarded 100 (maximum value) when saturated, wherein said antiferroelectric liquid crystal presents chiral smectic C$_A$-phase (SC$_A$*phase) in a temperature range of −20° C. to 10° C.

* * * * *